United States Patent [19]

Ozaki

[11] Patent Number: 5,801,638

[45] Date of Patent: Sep. 1, 1998

[54] SELECTIVE CALL RECEIVER WITH INDEPENDENT CONTROL OF DISPLAYED SERVICE AREA DATA AND SELECTED RADIO CHANNEL

[76] Inventor: Ichiro Ozaki, c/o NEC Shizuoka, Ltd., 4-2, Shimomata, Kakegawa-shi, Shizuoka, Japan

[21] Appl. No.: 633,436

[22] Filed: Apr. 17, 1996

[30] Foreign Application Priority Data

Apr. 17, 1995 [JP] Japan .................. 7-090597

[51] Int. Cl.$^6$ .................................................. H04Q 7/18
[52] U.S. Cl. .................. 340/825.44; 455/38.4; 455/456; 455/433; 455/435; 340/311.1; 340/825.47; 370/313
[58] Field of Search ........................ 455/38.4, 456, 455/432, 426, 433, 435, 526, 517, 575; 340/311.1, 825.44, 825.47, 825.52, 825.73, 825.69; 370/312, 313, 314

[56] References Cited

U.S. PATENT DOCUMENTS

| 4,644,347 | 2/1987 | Lucas et al. ............... 340/825.44 X |
| 5,182,553 | 1/1993 | Kung ......................... 340/825.44 |
| 5,187,470 | 2/1993 | King et al. ................. 340/825.44 |
| 5,196,842 | 3/1993 | Gomez et al. .............. 340/825.44 |
| 5,254,986 | 10/1993 | DeLuca ....................... 340/825.44 |
| 5,379,030 | 1/1995 | Nolan et al. ............... 340/825.44 X |
| 5,453,739 | 9/1995 | Kuramatsu ................. 340/825.44 |

FOREIGN PATENT DOCUMENTS 64-68036  3/1989  Japan .

*Primary Examiner*—Brian Zimmerman
*Assistant Examiner*—William H. Wilson
*Attorney, Agent, or Firm*—Ostrolenk, Faber, Gerb & Soffen, LLP

[57] ABSTRACT

A selective call receiver includes a relational data memory and a call number display processor in addition to a service area selector. The relational data memory stores plural data groups each corresponding to a different service area. The call number display processor selects a data group from the relational data memory according to the user's instruction. A call number and a service area name of the selected data group is displayed on screen. The receiving channel is determined by the service area selector selecting a data group from the memory according to a user's instruction independently of the call number display processor.

14 Claims, 3 Drawing Sheets

FIG. 2
TABLE IN MEMORY 108
|  | REC1 | REC2 | RECj |
|---|---|---|---|
| AREA NUMBER | AREA1 | AREA2 | – |
| AREA NAME | TOKYO | OSAKA | – |
| CALL NUMBER | 03-0000-1111 | 06-222-3333 | aa-bbb-cccc |
| CHANNEL DATA | CH1 | CH2 | CHj |
FIG. 3A
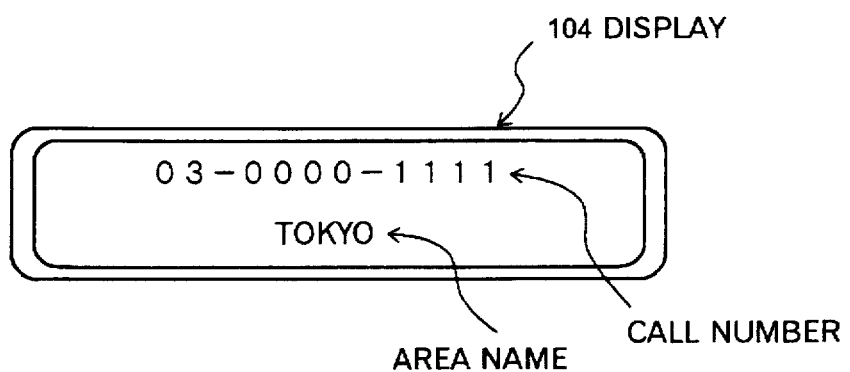
FIG. 3B
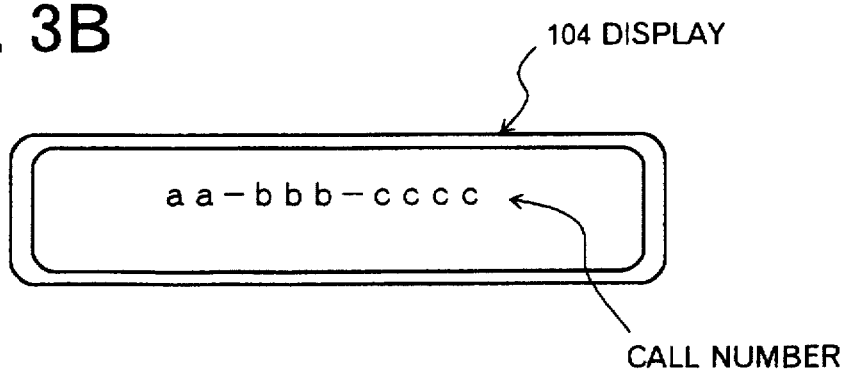

SELECTIVE CALL RECEIVER WITH INDEPENDENT CONTROL OF DISPLAYED SERVICE AREA DATA AND SELECTED RADIO CHANNEL

BACKGROUND OF THE INVENTION

1. Field of the Invention

The present invention generally relates to a selective call receiver, and in particular to a selective call receiver which is usable in a plurality of service areas.

2. Description of the Related Art

With the widespread use of selective call receivers, the desire to use it in different service areas grows more and more. To satisfy these needs, there has been proposed a selective call receiver which is usable in a plurality of service areas. Such a selective call receiver is provided with a frequency selector for selecting one from a plurality of receiving frequencies assigned to the selective call receiver in the respective service areas. When a single receiving frequency is selected, the channel number and the service area name corresponding the selected receiving frequency are displayed on screen so that its user can confirm which channel is being selected. A selective call receiver like this is disclosed in Japanese patent Unexamined publication No. 64-68036.

In the above selective call receiver, however, the channel number and the service area name on screen are associated with the selected receiving frequency. Therefore, the displayed information is changed depending on which channel is selected by the frequency selector. Since the respective receiving frequencies are predetermined in the service areas, the user cannot see the information of another service area without changing a receiving frequency.

Further, in a selective call system covering a plurality of service areas, a different call number or ID (identification) number is previously assigned to the selective call receiver for each service area. Since the conventional selective call receiver is designed to display only the channel number and the service area name associated with the selected receiving frequency, the user cannot inform another person, for instance, a customer being in another service area, of the call number corresponding to that service area without knowing the respective call numbers for service areas by heart.

SUMMARY OF THE INVENTION

An object of the present invention is to provide a selective call receiver which enables selectively displaying a plurality of call numbers and the respective service area names corresponding the call numbers.

Another object of the present invention is to provide a selective call receiver which enables selectively displaying a plurality of call numbers and the respective service area names corresponding the call numbers independently of channel selection.

Still another object of the present invention is to provide a selective call receiver which enables its user to easily confirm the call number predetermined in another service area.

According to an aspect of the present invention, a selective call receiver is provided with a relational data memory and a displayed data selector in addition to a service area selector. The relational data memory stores a plurality of data groups each corresponding to a different service area. The displayed data selector selects a data group from the relational data memory according to the user's instruction. Attribute data such as a call number and a service area name of the selected data group is displayed on screen.

Therefore, a call number of each service area can be displayed on screen by the user's instruction. Since the receiving channel is determined by the service area selector selecting a data group independently of the displayed data selector, the confirmation of the call numbers is performed by the user without changing the selected receiving channel. It is preferable that at first the displayed data selector selects the same data group as that selected by the service area selector.

More specifically, a data group is comprised of a service area name, a call number or identification number, and channel data, which are all associated with a single service area. As an example, the service area selector selects a first data group and transfers the channel data to the receiver and the call number to a call processor including a decoder.

BRIEF DESCRIPTION OF THE DRAWINGS

FIG. 2 is a schematic diagram showing an example of a data table stored in a memory provided in the selective call receiver;

FIG. 3A is a schematic diagram showing an example of displayed information of the selective call receiver;

FIG. 3B is a schematic diagram showing another example of displayed information of the selective call receiver.

DETAILED DESCRIPTION OF THE PREFERRED EMBODIMENTS

Figure 1:
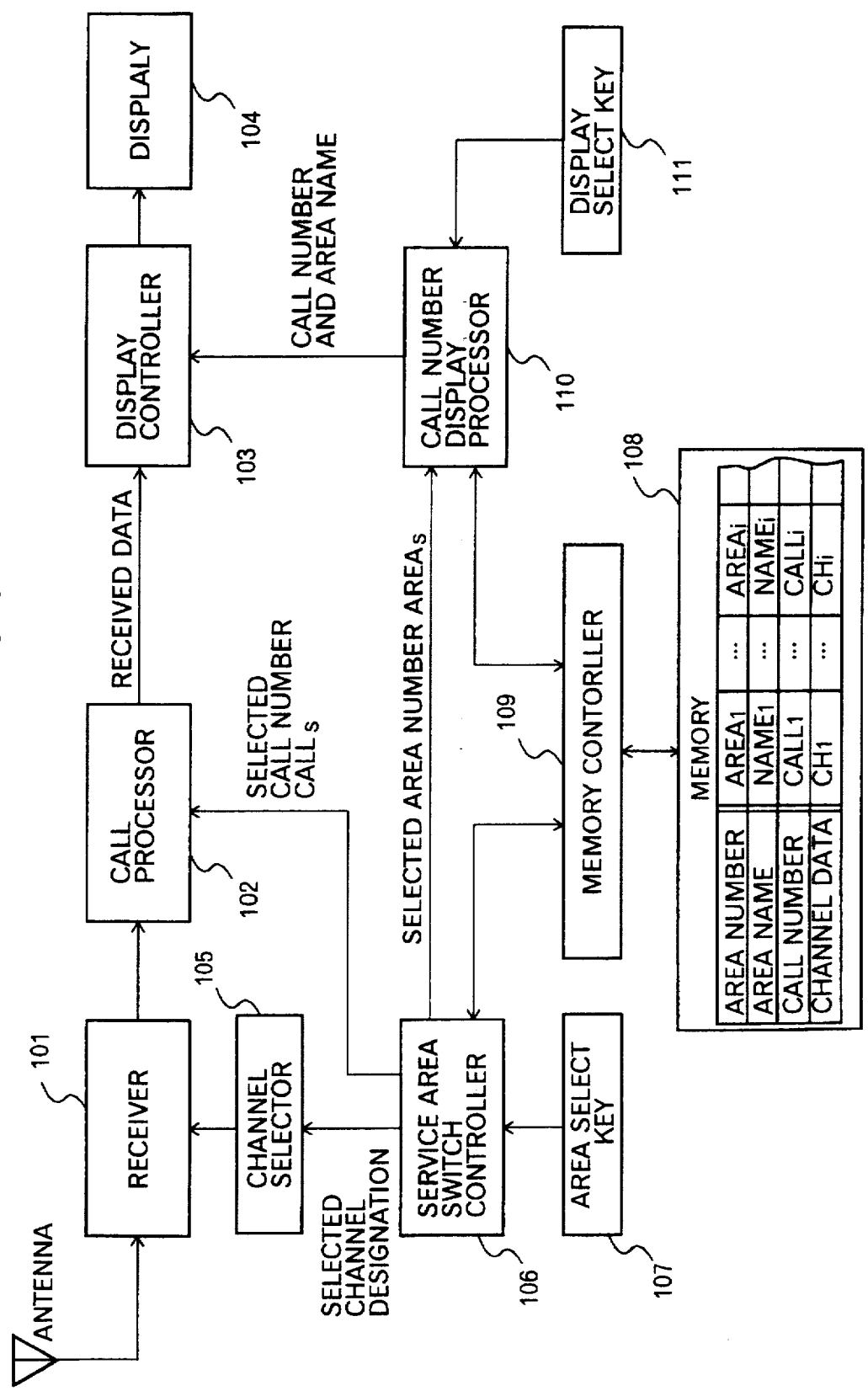
FIG. 1 is a block diagram showing a selective call receiver according to an embodiment of the present invention.

Referring to FIG. 1, a receiver 101 receives a radio signal from an antenna and outputs a demodulated received signal to a call processor 102. The call processor 102 compares a call number of the received signal to a selected call number $CALL_s$, and if they are identical, then the call processor 102 outputs received data to a display controller 103. The display controller 103 controls a display 104 such as a liquid crystal display so that the received data is displayed on screen.

A receiving channel or receiving frequency of the receiver 101 is determined by a local frequency received from a channel selector 105. The channel selector 105 which is a frequency synthesizer in this embodiment generates the local frequency according to a channel designation signal received from a service area switch controller 106. When a user pressing an area select key 107, the service area switch controller 106 sequentially reads out relational data groups from a memory 108 through a memory controller 109 and outputs a selected channel designation signal to the channel selector 105, a selected call number $CALL_s$ to the call processor 102, and a selected area number $AREA_s$ to a call number display processor 110. The channel selection may be performed automatically or sequentially every pressing the area select key 107. As described later, a relational data group includes an area number $AREA_i$, an area name $NAME_i$, a call number $CALL_i$ and channel data $CH_i$ which are grouped under a single service area.

The call number display processor 110 performs a call number display operation by the user pressing a display select key 111. When the display select key 111 is pressed, the call number display processor 110, referring to the selected area number $AREA_s$ received from the service area switch controller 106, reads a call number $CALL_i$ and the relational area name $NAME_i$ from the memory 108 through the memory controller 109 and displays them on the display 104 through the display controller 103. The call number display operation will be described in detail later.

As shown in FIG. 2, the memory 108 stores a relational table containing relational data groups each including an area number $AREA_i$, an area name $NAME_i$, a call number $CALL_i$ and channel data $CH_i$ which are grouped under a single service area. For example, the 1st relational data group $REC_1$ relates to the TOKYO service area, consisting of area number "$AREA_1$", area name "TOKYO", call number "03-0000-1111", and channel data "$CH_1$". Similarly, the 2nd relational data group $REC_2$ relates to the OSAKA service area, consisting of area number "$AREA_2$", area name "OSAKA", call number "06-222-3333", and channel data "$CH_2$". The jth relational data group $REC_j$ relates to non-registered service area, consisting of call number "aa-bbb-cccc" and channel data "$CH_1$". The area number and area name are not registered in the jth relational data group $REC_j$.

SERVICE AREA SELECTION CONTROL

Assuming that the user is in a service area whose area number is $AREA_i$, the user presses the area select key 107 to select an appropriate receiving channel. More specifically, when the user presses the area select key 107, the service area switch controller 106 reads one relational data group $REC_i$ from the memory 108 and transfers a channel designation signal corresponding to the channel data $CH_i$ to the channel selector 105, the call number $CALL_i$ to the call processor 102, and the area number $AREA_i$ to the call number display processor 110. The service area switch controller 106 repeats such a data reading operation automatically until the appropriate receiving channel is found. This data reading operation may be performed every the user presses the area select key 107.

After the appropriate receiving channel has been determined, the service area switch controller 106 is providing the selected call number $CALL_s$ and the selected area number $AREA_s$ which are associated with the appropriate receiving channel to the call processor 102 and the call number display processor 110, respectively. The call processor 102 uses the selected call number $CALL_s$ to extract data of its own from the received signal. Since the respective call numbers are uniquely predetermined in the service areas, the selective call can be achieved in all the service areas by selecting an appropriate receiving channel as mentioned above.

CALL NUMBER DISPLAY CONTROL

As illustrated in FIGS. 3A and 3B, in cases where a full data group such as the ith relational data group $REC_i$ and the (i+1)th relational data group $REC_{i+1}$ is read from the memory 108 to the call number display processor 110, both the call number and the area name are displayed on screen as shown in FIG. 3A. On the other hand, when an area number is not registered as in the jth relational data group $REC_j$, only its call number is displayed as shown in FIG. 3B. By the user pressing the display select key 111, the call number display processor 110 performs the call number displaying without changing the receiving channel. This will be described in detail hereinafter.

Figure 4:
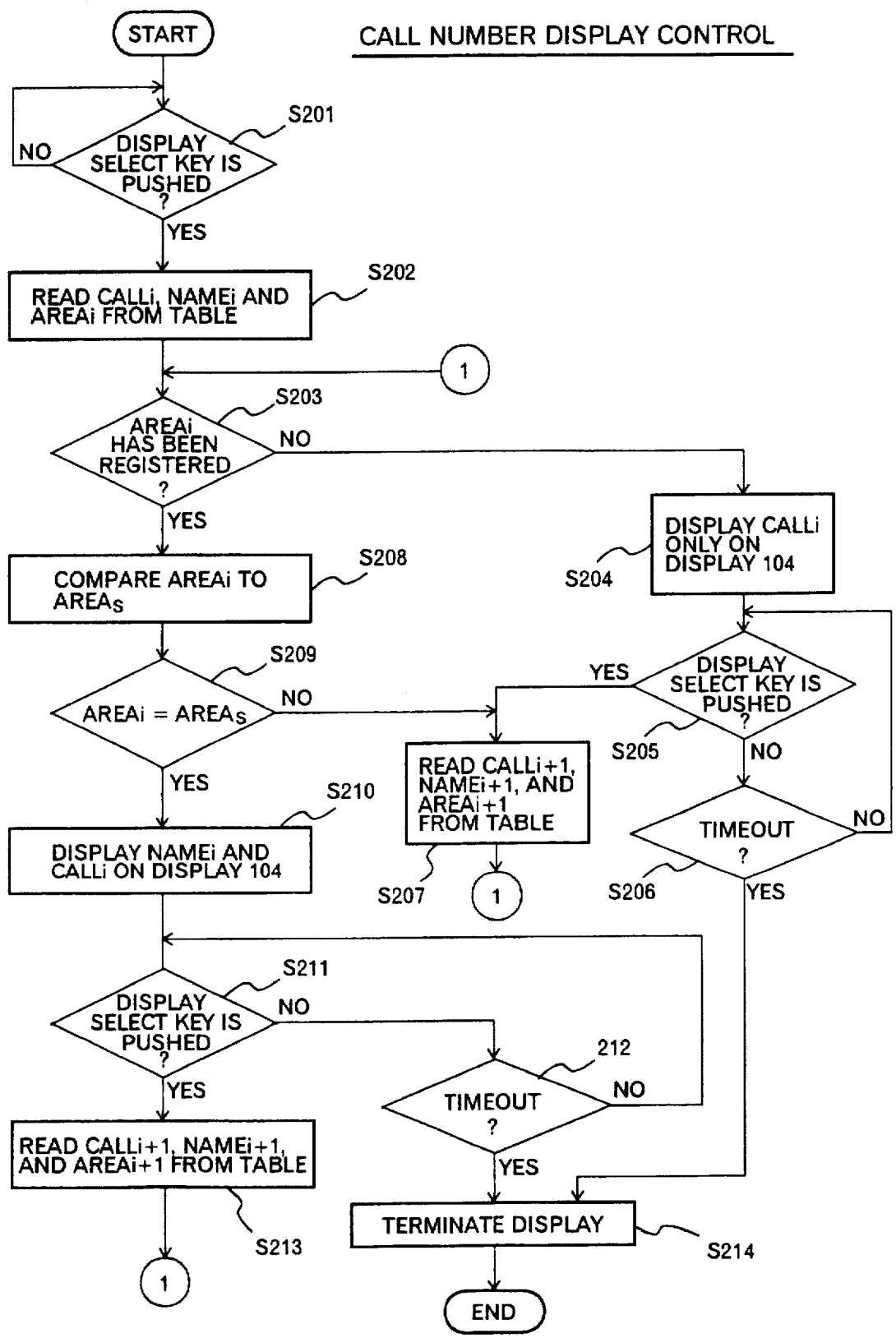
FIG. 4 is a flow chart showing a call number display control according to an embodiment of the present invention.

Referring to FIG. 4, when the user presses the display select key 111 (YES in step S201), the call number display processor 110 reads one relational data group $REC_i$ including an area number $AREA_i$, an area name $NAME_i$, and a call number $CALL_i$ from the memory 108 (step S202) and then checks whether the area number $AREA_i$ is registered already (S203).

When the area number $AREA_i$ is not registered as the relational data group $REC_j$(NO in step S203), then the call number display processor 110 transfers only the call number $CALL_i$ to the display controller 103 to display it on the display 104 (step S204). Subsequently, the call number display processor 110 waits for next pressing of the display select key 111 until a time-out occurs (steps S205 and S206). When the user presses the display select key 111 (YES in step S205), the call number display processor 110 reads the subsequent relational data group $REC_{i+1}$ including an area number $AREA_{i+1}$, an area name $NAME_{i+1}$, and a call number $CALL_{i+1}$ from the memory 108 (step S207) and then returns to the step S203.

When the area number $AREA_i$ is registered as the relational data groups $REC_1$ and $REC_2$ (YES in step S203), then the call number display processor 110 compares the read area number $AREA_i$ to the selected area number $AREA_s$ which is received from the service area switch controller 106 (step S208). If they are different (NO in step S209), the call number display processor 110 reads the subsequent relational data group $REC_{i+1}$ including an area number $AREA_{i+1}$, an area name $NAME_{i+1}$, and a call number $CALL_{i+1}$ from the memory 108 (step S207) and then automatically repeats the steps S203–S209 until a read area number becomes identical to the selected area number $AREA_s$.

When the read area number $AREA_i$ is identical to the selected area number $AREA_s$ (YES in step S209), the call number display processor 110 transfers the area name $AREA_i$ and the call number $CALL_i$ to the display controller 103 to display them on the display 104 (step S210). Subsequently, the call number display processor 110 waits for next pressing of the display select key 111 until a time-out occurs (steps S211 and S212). When the user presses the display select key 111 (YES in step S211), the call number display processor 110 reads the subsequent relational data group $REC_{i+1}$ including an area number $AREA_{i+1}$, an area name $NAME_{i+1}$, and a call number $CALL_{i+1}$ from the memory 108 (step S213) and then returns to the step S203. When a time-out occurs (YES in steps S206 and S212), the call number display processor 110 instructs the display controller 103 to terminate the displaying operation (step S214).

What is claimed is:

1. A selective call receiver comprising:

a display;

a receiving section receiving a call signal on a radio channel selected from a plurality of predetermined radio channels corresponding to a plurality of service areas, respectively;

a memory storing a plurality of data groups associated with service areas, respectively, and each of the data groups including area channel data and area attribute data;

a first selector selecting one of the predetermined radio channels;

a second selector selecting one of the data groups to display area attribute data of a selected data group; and a controller controlling so that the area attribute data of the selected data group is displayed on the display independently of changing a selected radio channel.

2. The selective call receiver according to claim 1, wherein the second selector initially selects a data group including area channel data corresponding to the selected radio channel.

3. The selective call receiver according to claim 1, wherein the attribute data associated with each of the service areas comprises a service area name and a call number, the call number being previously assigned to the selective call receiver.

4. The selective call receiver according to claim 3, wherein at least the call number of the attribute data included in the selected data group is displayed on the display.

5. The selective call receiver according to claim 1, wherein the first selector comprises:

an area switch controller reading a desired data group from the memory according to an input instruction; and a channel selector selecting a radio channel depending on area channel data included in the desired data group.

6. The selective call receiver according to claim 5, wherein the area switch controller sequentially reads the data groups one by one from the memory until the desired data group is found.

7. The selective call receiver according to claim 1, wherein the second selector comprises:

a display controller reading a desired data group from the memory according to an input instruction to display the area attribute data of the desired data group on the display.

8. The selective call receiver according to claim 7, wherein the display controller initially reads a data group including area channel data corresponding to the selected radio channel.

9. The selective call receiver according to claim 7, wherein the attribute data associated with each of the service areas comprises a service area name and a call number, the call number being previously assigned to the selective call receiver.

10. The selective call receiver according to claim 9, wherein at least the call number of the attribute data included in the selected data group is displayed on the display.

11. A method for displaying specifying information on a display in a selective call receiver, the selective call receiver having a receiver for receiving a call signal on a radio channel selected from predetermined radio channels which have previously been assigned to a plurality of service areas, respectively, the method comprising the steps of:

storing a plurality of data groups associated with service areas, respectively, and each of the data groups including area channel data and attribute data;

selecting one of the predetermined radio channels;

selecting one of the data groups to display area attribute data of a selected data group;

displaying the area attribute data of the selected data group on the display without changing the selected radio channel.

12. The method according to claim 11, wherein a data group including area channel data corresponding to the selected radio channel is initially selected when a first display selection instruction is input.

13. The method according to claim 11, wherein the attribute data associated with each of the service areas comprises a service area name and a call number, the call number being previously assigned to the selective call receiver.

14. The method according to claim 13, wherein at least the call number is extracted from the attribute data included in a second data group and is displayed on the display.

* * * * *

UNITED STATES PATENT AND TRADEMARK OFFICE
CERTIFICATE OF CORRECTION

PATENT NO. :  5,801,638
DATED      :  September 1, 1998
INVENTOR(S) : Ichiro Ozaki It is certified that error appears in the above-identified patent and that said Letters Patent is hereby corrected as shown below:

On the front page of the patent, insert --NEC Corporation, Tokyo, Japan-- as the Assignee.

Signed and Sealed this

Thirtieth Day of March, 1999

Attest:

Q. TODD DICKINSON

*Attesting Officer*  *Acting Commissioner of Patents and Trademarks*